United States Patent [19]

Bulang

[11] 4,197,713
[45] Apr. 15, 1980

[54] PROCESS AND PLANT FOR THE RECOVERY OF WATER FROM HUMID AIR

[75] Inventor: Wolfgang Bulang, Eichenau, Fed. Rep. of Germany

[73] Assignee: M.A.N. Maschinenfabrik Augsburg-Nuernberg Aktiengesellschaft, Augsburg, Fed. Rep. of Germany

[21] Appl. No.: 871,841

[22] Filed: Jan. 24, 1978

[30] Foreign Application Priority Data

Jan. 24, 1977 [DE] Fed. Rep. of Germany ....... 2702701

[51] Int. Cl.$^2$ ...................... F25D 17/06; F25D 23/00
[52] U.S. Cl. ...................................... 62/94; 202/234; 203/49; 62/271
[58] Field of Search ................. 62/94, 271, 93; 55/31, 55/33; 203/49; 202/234

[56] References Cited

U.S. PATENT DOCUMENTS

| | | | |
|---|---|---|---|
| 2,690,656 | 10/1954 | Cummings | 62/94 |
| 2,926,502 | 3/1960 | Munters et al. | 62/271 |
| 3,153,914 | 10/1964 | Meckler | 62/94 |
| 3,436,839 | 4/1969 | Ellington | 55/33 |
| 3,606,730 | 9/1971 | Clark et al. | 55/33 |
| 4,050,262 | 9/1977 | Mehnert | 62/93 |
| 4,057,403 | 11/1977 | Valdes | 55/31 |

*Primary Examiner*—Lloyd L. King
*Attorney, Agent, or Firm*—Schwartz, Jeffrey, Schwaab, Mack, Blumenthal & Koch

[57] ABSTRACT

A process and a plant for the recovery of water from humid air are disclosed. Humid ambient air flows through an adsorber in which an adsorbing agent removes moisture from the air by adsorption. Subsequently, air heated by an air heater and delivered by a fan flows through the adsorber in order to recover by desorption the moisture from the moistened adsorbing agent. Thereafter, the water vapor-containing air is precooled in a counterflow heat exchanger and subsequently conducted into a condenser in which heat is extracted from it by means of a heat pump so that the water vapor condenses and is available in the form of liquid water. The air cooled and dried in the condenser is utilized in the counterflow heat exchanger for precooling the air fed into the condenser. The heat given off by the heat pump is supplied to the air heater in order to be utilized therein for heating the air flowing through the air heater.

9 Claims, 2 Drawing Figures

PROCESS AND PLANT FOR THE RECOVERY OF WATER FROM HUMID AIR

BACKGROUND OF THE INVENTION (1) Field of the Invention

The present invention is concerned with a process for the recovery of water from humid air and with a plant for carrying out the process.

(2) Description of the Prior Art

Processes for drying air and other gases are known. According to these processes the water vapor is either condensed by means of refrigerating machines or it is adsorbed by adsorbing agents such as molecular sieves, activated carbon, or silica gel.

In a known process for recovering water from the atmosphere the water vapor contained in the atmosphere is condensed on plastic sheets cooled by nightly radiation and the drops of water formed are collected. The yield of this process is very low.

SUMMARY OF THE INVENTION

It is one object of the present invention to provide an advantageous and highly effective, novel process for recovering water from the atmosphere or humid air which process increases considerably the amounts of water recovered as compared with those recovered by the known processes.

Another object of the present invention is to provide a suitable system or plant for carrying out said process, said system or plant making use of a highly effective adsorbing agent and of a condensing means.

Other objects of the present invention and advantageous features thereof will become apparent as the description proceeds.

In principle the present invention is based on the following process steps:

The humid air is contacted with an adsorbing agent which is capable of extracting and adsorbing the moisture from the air. The moisture-containing adsorbing agent is then contacted with dry air which recovers and desorbs the moisture from the adsorbing agent. Thereupon the air containing the moisture desorbed from the adsorbing agent is supplied to a condensing means in which heat is extracted from the humid air so that the water vapor contained therein is condensed. Finally the water formed by condensation of the water vapor is collected.

According to the process of the present invention the air contacted with the adsorbing agent loses and transfers a portion of its moisture content to the adsorbing agent with a change of state which is nearly isenthalpic and with a simultaneous rise in temperature. The entropy formed by mixing the dry air and the moisture is removed from the resulting humid air in the condenser. The desorption step proceeds in a nearly isenthalpic manner while the air temperature decreases with increasing absolute and relative humidity. Thus the process according to the present invention is highly advantageous insofar as the yield of recovered water is substantially higher than with the known process.

According to a further embodiment of the present invention, the heat withdrawn from the humid air in the condenser is supplied to the dry air before the dry air is brought into contact with the adsorbing agent. In this embodiment the dry air is heated to a temperature between about 50° C. to 60° C. so that its power of absorption or receptivity for the moisture contained in the adsorbing agent is considerably increased.

According to another embodiment of the present invention, the air cooled in the condenser is utilized for precooling the air entering the condenser. Due to such precooling of said air its enthalpy is decreased so that the temperature of the air is lowered and/or the water vapor contained in the air condenses.

According to still another embodiment of the present invention the humid air, prior to contacting the adsorbing agent, is cooled to such a temperature that its relative humidity corresponds approximately to the saturation value.

According to a further embodiment of the present invention, when carrying out the process in arid and semi-arid zones in which considerable differences in the day-time and the night temperatures are encountered, the humid air is derived during the night-time from those layers of air which are close to the ground and are saturated with water vapor. Such humid night-time air is conducted into the adsorbing agent while the withdrawal of the moisture from the adsorbing agent is effected during the day-time.

According to an especially advantageous embodiment of the present invention there is provided a highly effective system or plant for carrying out the process of the present invention, said system or plant being characterized by comprising an air heater, at least one adsorber, a heat exchanger, a condenser, a heat pump, and a pipe line system which interconnects the air heater with the adsorber, the adsorber with the heat exchanger, the heat exchanger with the condenser, the condenser with the heat pump, and the heat pump with the air heater.

Particularly useful adsorbing agents are specific types of silica gel which have wide pores and a low heat of wetting, and which are capable of desorbing or giving off the adsorbed water to a large extent at a temperature of about 30° C. or even lower. Depending upon the proportions of the silica gel employed an adsorption of water in the adsorber up to 75 g./100 g. of gel can be achieved if the relative humidity in the adsorber does not substantially decrease below 50–60%.

In order to operate the system or plant according to the present invention near the sea shore where constant air temperatures and a higher absolute humidity prevail, the system or plant advantageously comprises at least two adsorbers which enable a combination of at least two cycles of operation by alternately charging and regenerating the two adsorbers, i.e. by charging and regenerating one adsorber simultaneously with regenerating and charging the other adsorber. In this case excess heat is expediently dissipated into the sea the temperature of which is generally lower than that of the air.

According to another embodiment of the present invention a multiple stage heat pump is employed. The heat pump is driven by a motor or is an adsorber pump operated by solar energy.

BRIEF DESCRIPTION OF THE DRAWINGS

An advantageous embodiment of the present invention is shown in the attached drawings and will be further described hereinafter. In said drawings FIG. 1 shows schematically a system or plant for carrying out the process of recovering water according to the present invention, while

DESCRIPTION OF THE PREFERRED EMBODIMENTS

Figure 1:
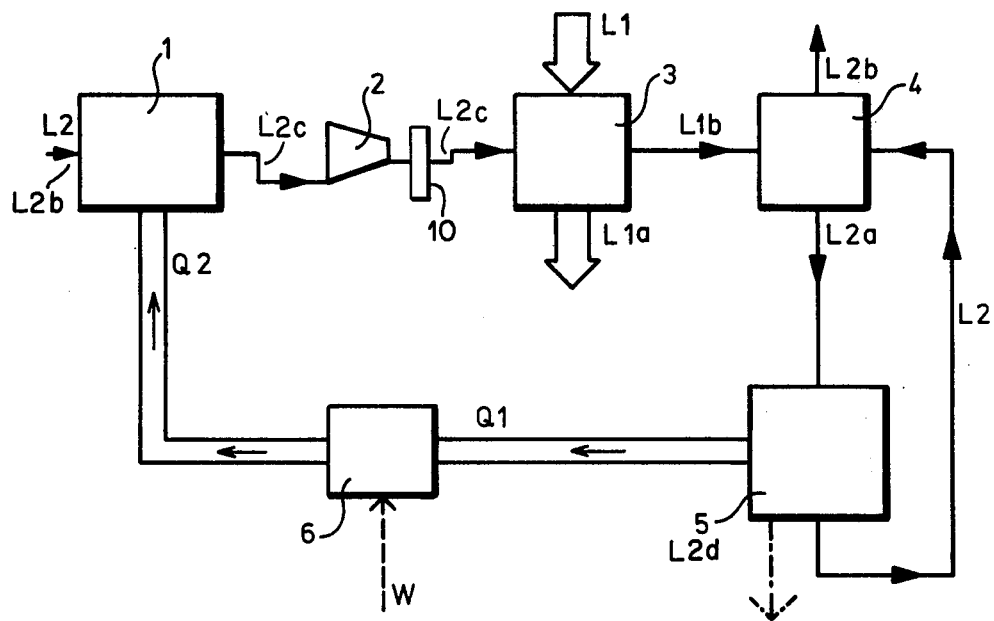

The system or plant for carrying out the process of recovering water from the atmosphere according to the present invention comprises an air heater 1 which is connected via fan 2 to an adsorber 3 containing silica gel as adsorbing agent.

Adsorber 3 is connected to a first inlet of counterflow heat exchanger 4, the second inlet and the first outlet of which are connected with condenser 5 and the second outlet of which leads to the open air.

Condenser 5 is connected to heat pump 6. It has an outlet for the water obtained on condensation. Heat pump 6 has a motor drive W which is represented by a dotted arrow and is connected to air heater 1.

When the plant is in operation, humid air L1 flows through adsorber 3 in which the adsorbing agent withdraws the moisture from the air L1 and adsorbs it. The humid air flowing through adsorber 3 was already cooled before entering said adsorber 3 by contacting the ground cooled by the nightly radiation of heat. After the adsorbing agent is charged with moisture from the cooled air L1, fan 2 delivers hot air from air heater 1 to adsorber 3. The hot air withdraws the moisture from the adsrobing agent and adsorbs it. The moisture-charged air L1b is then conducted into counterflow heat exchanger 4 in which it gives off heat to the cool air emanating from condenser 5 and flowing thereafter into the open through outlet L2b. The thus precooled air L2a is conducted into condenser 5 in which heat Q1 is extracted from it by heat pump 6 so that the water vapor contained in the air is condensed. The resulting drops of water precipitate on the condenser walls and are collected. The water may be recovered from the condenser via the outlet L2d, shown by the dash-dotted arrow. The air L2 cooled in condenser 5 flows back into heat exchanger 4 in which it is utilized for precooling the moist air L1b passing through adsorber 3. The heat indicated by Q2 as it is given off by heat pump 6 is supplied to air heater 1 and is utilized therein for heating the air L2b flowing through said air heater 1. The air L2b flowing through said air heater 1 is drawn from the atmosphere. In FIG. 1 the air flow from air heater 1 to condenser 5 and from condenser 5 to counterflow heat exchanger 4 is designated by L2c, L1b, L2a, and L2 and the direction of flow of this air flow is indicated by the arrows drawn between said air heater, adsorber, heat exchanger, and condenser.

In between the fan 2 and adsorber 3 may be positioned a cooling means 10 wherein the moist air is cooled such that its relative humidity approximates the saturation value.

Figure 2:
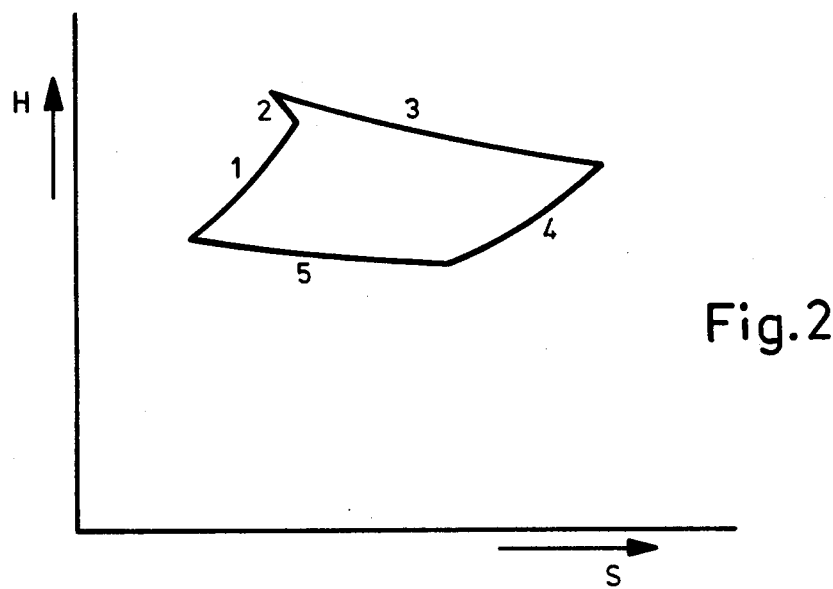
FIG. 2 illustrates by means of an enthalpy-entropy-graph the thermodynamic change of state of the air flowing through the system or plant as shown in FIG. 1.

FIG. 2 shows the total change of state of the air flowing from air heater 1 to condenser 5. The enthalpy values H and the entropy values S are plotted respectively along the ordinate and the abscissa of the graph.

The sections of the curve marked with numerals represent the change of state of the air in the various units 1, 2, 3, 4, 5, and 6 of the system or plant. Said numerals are identical with the numerals of the units of the system or plant. The changes of state of the air in adsorber 3 do not proceed in a completely isenthalpic manner because heat of wetting is supplied to and extracted from the air in adsorber 3.

Of course, many changes and variations in the apparatus and the like used in the system or plant according to the present invention may be made by those skilled in the art in accordance with the principles set forth therein and in the claims annexed hereto.

I claim:

1. A process for recovering water from humid air, comprising the steps of:
   (a) contacting the humid air with an adsorbing agent to withdraw moisture from the air and to adsorb the same,
   (b) contacting the moistened adsorbing agent with dry air to recover the moisture from the adsorbing agent and to adsorb said moisture,
   (c) conducting the air containing moisture removed from the adsorbing agent to a condenser and extracting heat from the moist air so that the water vapor contained therein is condensed,
   (d) collecting the water formed by condensation of the water vapor, and
   (e) transferring heat extracted from the moist air to the dry air for heating the dry air before the dry air is contacted with the adsorbing agent.

2. The process according to claim 1, in which the air cooled in the condenser is utilized for precooling the air entering the condenser.

3. The process according to claim 1, in which, prior to contacting the adsorbing agent, the moist air is cooled such that its relative humidity approximates the saturation value.

4. The process according to claim 2, in which, prior to contacting the adsorbing agent, the moist air is cooled such that its relative humidity approximates the saturation value.

5. The process according to claim 1, in which during the night-time the moist air to be dehumidified is recovered from layers of air which are close to the ground and are saturated with water vapor and in which said moist air is supplied to the adsorbing agent, while recovery of the moisture takes place during the day-time.

6. Apparatus for recovering water from humid air comprising:
   (a) means for directing humid air for contact with an adsorbing agent to withdraw moisture from the humid air, said adsorbing agent adsorbing said moisture,
   (b) means for directing dry air for contact with said moistened adsorbing agent, said dry air adsorbing moisture from said moistened adsorbing agent,
   (c) a condenser connected to receive said moisture containing air for removing moisture therefrom,
   (d) heat pump means connected in heat exchange relationship with said moisture containing air of said condenser for extracting heat therefrom,
   (e) air heating means for heating said dry air prior to its contact with said moistened adsorbing agent, and
   (f) said heat pump means connected in heat exchange relationship with said dry air of said air heating means for transferring thereto heat extracted from said condenser.

7. The system according to claim 6, said system comprising a multiple-stage heat pump.

8. Apparatus as recited in claim 6 further comprising means for precooling said moisture containing air prior to its entering said condenser.

9. Apparatus as recited in claim 8 wherein said precooling means comprises a heat exchanger connected in heat exchange relationship with relatively cool air leaving said condenser.

* * * * *